July 31, 1962 E. J. SOURBER 3,047,050
HOT AIR WELDING APPARATUS
Filed June 19, 1959 3 Sheets-Sheet 1
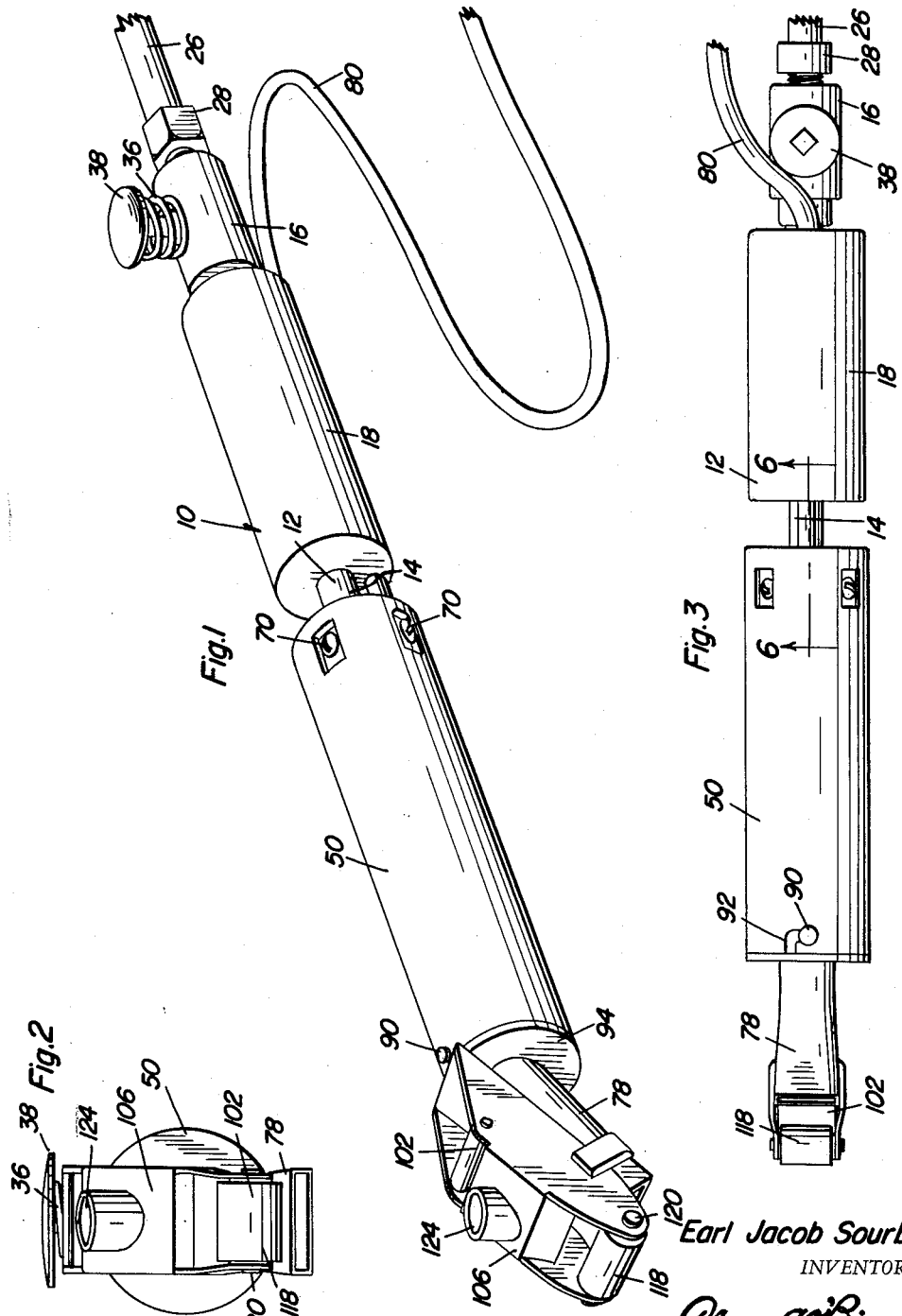
Earl Jacob Sourber
INVENTOR.

July 31, 1962
E. J. SOURBER
3,047,050
HOT AIR WELDING APPARATUS
Filed June 19, 1959
3 Sheets-Sheet 2
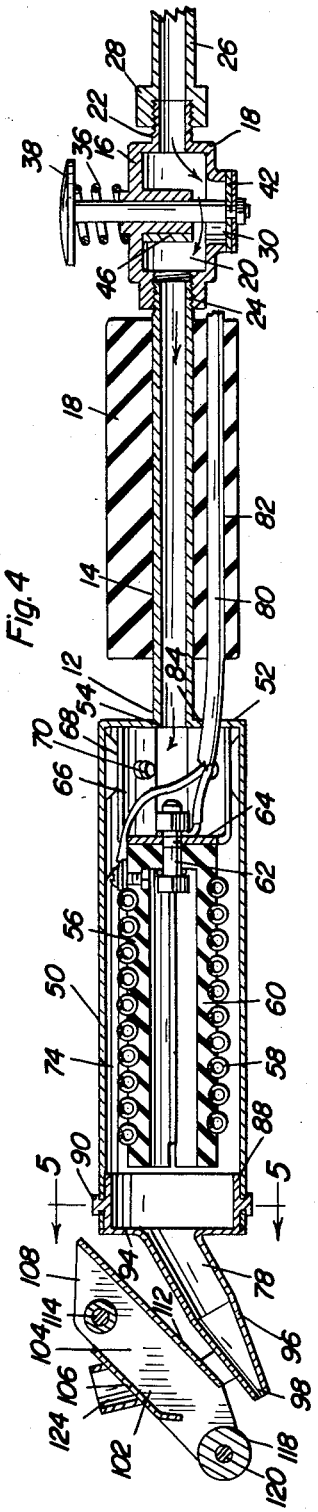
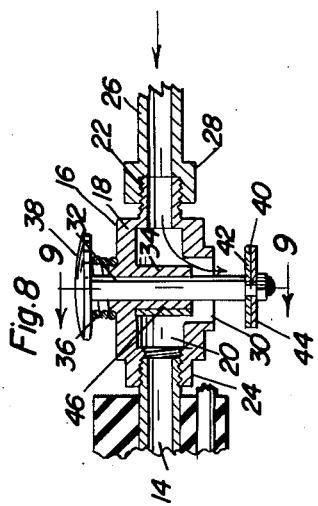
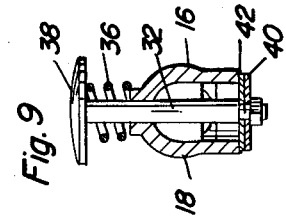
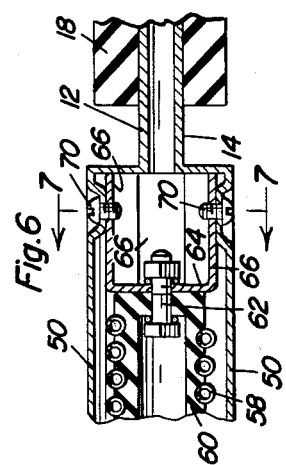
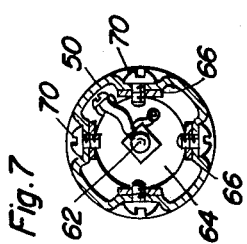
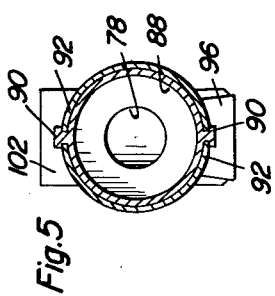
Earl Jacob Sourber
INVENTOR.
BY *Clarence A. O'Brien*
*and Harvey B. Jacobson*
Attorneys July 31, 1962 E. J. SOURBER 3,047,050
HOT AIR WELDING APPARATUS
Filed June 19, 1959 3 Sheets-Sheet 3
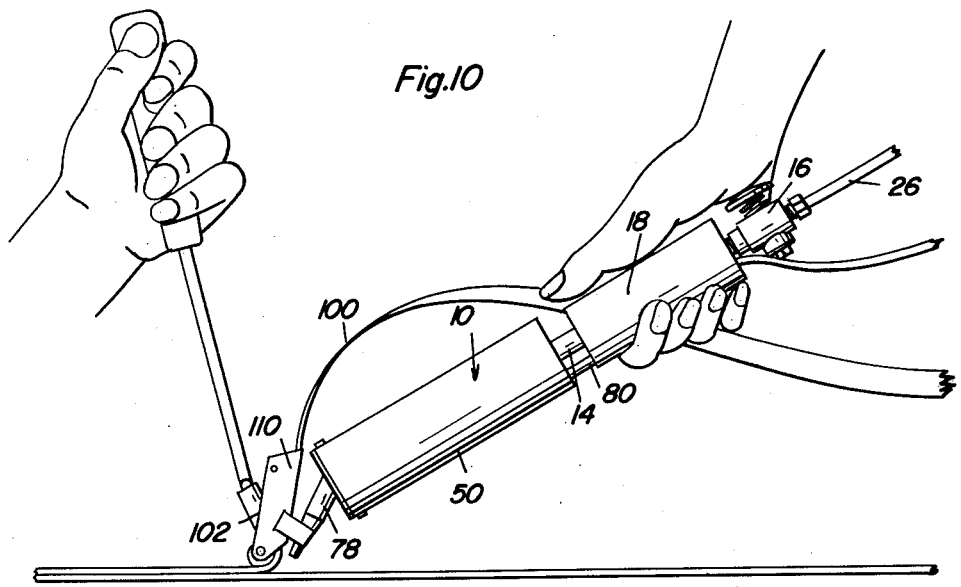
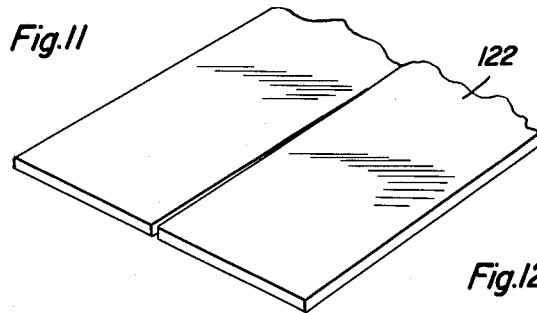
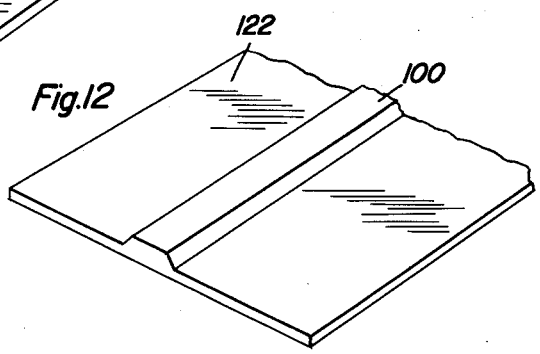
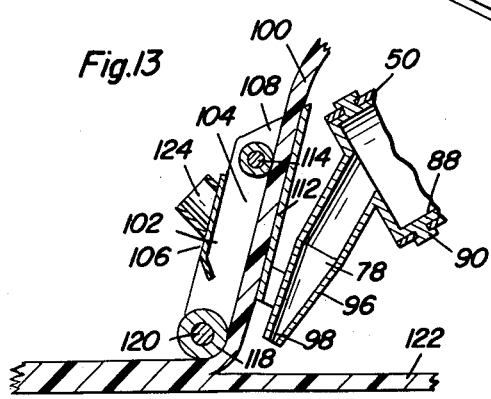
Earl Jacob Sourber
INVENTOR.

United States Patent Office 3,047,050
Patented July 31, 1962

3,047,050
HOT AIR WELDING APPARATUS
Earl Jacob Sourber, 1817 Highland St., Allentown, Pa.
Filed June 19, 1959, Ser. No. 821,558
4 Claims. (Cl. 156—497)

This invention relates to welding equipment and more particularly to welding apparatus for thermoplastic substances such as rubber and the thermoplastic class of plastic materials.

An object of the invention is to provide an easily used and exceedingly effective welding apparatus which materially facilitates welding thermoplastic substances such as rubber or the thermoplastic group of commercially available plastic materials.

A further object of the invention is to provide a welding apparatus by which the weld is made by application of a properly directed stream of heated air, and wherein the elongate part, usually a strip, which is being applied to the base sheet or panel is considerably more easily handled.

One of the important features of the invention is found in a by-pass air valve and its location with reference to the handle of the welding apparatus. The valve operator is located under the palm of the same hand which holds the welding gun. The function of the valve is to by-pass incoming air when the welder wishes to reduce the heat.

A further feature of the invention is the handle construction. It is separated from the heating element so that it tends to remain cool. There is no substantial heat conduction between the feeding element cover and the handle.

A very important feature of the invention is the method of heating the strip of plastic at the nozzle which discharges heated air. There is a roller normally placed on the strip and the strip is firmly pressed in the plastic panel on which the strip is to be welded. The welder may apply a downward force on the entire gun which is transmitted through the roller to the strip and ultimately to the panel or sheet on which the strip is being welded.

As soon as the strip is started, that is as soon as the initial weld is made, the welder commences a continual operation by simply pressing down on the gun and pulling at the same time. There is a small socket or an equivalent corresponding device at the top part of the tip supported strip feeding mechanism to receive a screwdriver or like tool so that the welder may apply additional force by pressing downward on the screwdriver. This additional force is transmitted to the roller which ultimately is applied to the strip and sheet, pressing the strip firmly against the sheet during welding operations.

A welding gun in accordance with this invention is a definite time-saving device enabling the entire procedure to be accomplished with one hand. That is, the strip is automatically fed, not by complicated feeding mechanism, but by simply attaching one end as the initial weld commences and pulling the welding gun in a direction so that the strip is automatically fed in the proper relationship to the panel on which the strip is being applied and the heated air is directed correctly in the region of the juncture between the strip and panel.

A possible use of the welding gun is for welding strips in tank linings. Acid tanks, for example, usually having tank linings of plastic material, e.g. polyvinyl chloride, although other substances such as rubber or other plastics may be the welding subject. Tank liners are made from sheets of rubber or plastic and they have requirements for seams along the surface of the sheet or at the corners. This requires the application of more or less heat under different local conditions and especially where ribs have to cross over. Unless the heat is controlled, either too little or not enough heat may be applied with the result that the liner will buckle and pinch or otherwise become distorted.

The heat control that is, the air valve, solves this difficulty by enabling the welder to cut off the flow of hot air at any instant or at any place along the welding procedure. This permits the material to cool before the welder moves to the next step or continues with the procedure. Unless this were done, it has been found that small holes will appear in the liner and these, of course, are sources of leaks.

When a welder tries to weld over a place that has already been once welded, the application of heat for a second time on the original weld, will cause the original weld to pull up. This leads to a very important function of the air valve. The welder may discontinue temporarily the application of heated air when he is moving in the region of a previous weld.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a welding gun in accordance with the invention.

FIGURE 2 is a front view of the welding gun.

FIGURE 3 is a top view of the welding gun.

FIGURE 4 is a longitudinal sectional view of the welding gun.

FIGURE 5 is a sectional view taken on the line 5—5 of FIGURE 4.

FIGURE 6 is a sectional view taken on the line 6—6 of FIGURE 3.

FIGURE 7 is a sectional view taken on the line 7—7 of FIGURE 6.

FIGURE 8 is a sectional view of the valve of the welding gun showing the valve in the open position.

FIGURE 9 is a sectional view taken on the line 9—9 of FIGURE 8.

FIGURE 10 is a perspective view showing the welding gun in use.

FIGURE 11 is a fragmentary perspective view of a panel on which a strip is to be welded.

FIGURE 12 is a fragmentary perspective view showing a strip on the panel of FIGURE 11.

FIGURE 13 is a fragmentary sectional view showing the welding gun in use.

In the accompanying drawings there is a welding gun 10 which exemplifies the principles of the invention. This welding gun has a main body 12 constructed of a tube 14 having a valve 16 at one end and provided with a heat insulating handle 18. The handle may be cylindrical or of other shapes which are specifically contoured to receive the fingers of the welder.

Valve 16 has a valve body 18 provided with a valve chamber 20 with which aligned nipples 22 and 24 are registered. A conduit 26 which is preferably flexible, is attached by means of coupling 28 to nipple 22 in order to apply air under pressure from a source (not shown) to valve chamber 20.

Valve 16 is a two-way valve having two positions shown in FIGURES 4 and 8 respectively. It enables air to flow from conduit 26 to tube 14 which is connected to nipple 14, or to be discharged through discharge port 30 as shown in FIGURE 8. The valve includes a valve stem 32 which is reciprocably mounted in a sleeve 34 that enters and extends transversely of valve chamber 20. Spring 36 seats upon the body 18 of the valve 16 and on the valve pusher disk 38 attached to the upper end of valve stem 32. The lower end of the valve stem has a valve element 40 which is preferably made of a resilient disk 42 seating on a metallic disk 44 that is attached to the valve stem. The valve element is located on the exterior of the valve body and is arranged to control port 30.

The normal position of valve 16 is shown in FIGURE 4. The normal position is established by having spring 36 retract the valve element 42 to the port 30 closing position, at which air flows axially through chamber 20 and enters tube 14. However, when the valve disk 38 is depressed, preferably by the palm of the same hand which holds the welding gun by gripping handle 18, port 30 is opened and the air enters valve chamber 20; strikes transverse baffle 46 and takes the path of least resistance which is through the open valve port 30 for spilling out of the valve body. When the valve is in the closed position (FIGURE 4) there is sufficient clearance between baffle 46 and the lower part of the valve chamber to allow the air to flow into tube 14.

Body 12 of the gun has a housing 50 attached to the tube 14, the housing preferably, but not necessarily, being cylindrical in cross-section. One end of the housing 50 has a transverse wall 52 and a central opening 54 with which the bore of tube 14 is registered. A conventional heating element 56 of the electrically operative type, is disposed in housing 50 and is made of a resistance coil 58 wound around a ceramic form 60 that is attached by means of bolts 62 to a transverse wall 64 in housing 50. The wall has a plurality of strips 66 extending therefrom with spaces 68 between the strips. Screws 70 or like fasteners extend through apertures in the wall of housing 50 and are engaged in apertures in strips 66 thereby positioning and holding the heating element within housing 50 and in such position that there is an air passage jacket 74 of cylindrical formation between the inner surface of housing 50 and the resistance coil 58. The openings 68 between strips 66 constitute air passages through which the air from tube 14 flows, permitting it to enter passage 74 and flow to the tip and nozzle 78. The heating element is energized from an electrical source (not shown) and by way of electrical conductor 80 that extends through an elongate passage 82 in the handle 18 and which enters housing 50 by way of aperture 84 in wall 52 thereof.

The nozzle and tip structure consists of a collar 88 with keys 90 projecting radially from the outer surface thereof. The collar fits into the outer end of housing 50 and the keys 90 engage in bayonet slots 92 thereby separably holding the tip structure in place on the outer end of housing 50. There is a wall 94 extending across the outer face of collar 88, and it has a downwardly and forwardly extending air conduit 96 connected therewith and whose bore is in registry with air chambers 74. Tube 96 has a tapered discharge end 98 and is equipped with a strip 100 feed or guide mechanism 102. The feed mechanism is made of an open-ended sleeve 104 having an upper transverse wall 106 extending between sides 108 and 110, together with a lower transverse wall 112 extending between the same sides and attached thereto. Wall 112 is near nozzle 78 so that the heat radiating therefrom will heat wall 112 and preheat strip 100. A transverse roller 114 extends between walls 108 and 110 and is mounted for rotation to function in cooperation with the wall 112 (FIGURE 3) in guiding strip 100. A forwardly mounted roller 118 is mounted for rotation on a transverse spindle 120 that is secured to the forward projecting parts of walls 108 and 110, and this is a pressure roller adapted to bear against the upper surface of strip 100.

In order to increase the pressure between roller 118 and a typical workpiece, for instance panel 122 (FIGURES 11 and 12), there is a socket 124 fixed to the top part of wall 108 and adapted to receive another tool by which to apply downward force onto structure 102. This tool may be a screwdriver or a like tool or an improvised tool such as a rod.

The use and operation of the invention has already been described. Tracing the air flow, reference is made to FIGURE 4 showing that the air passing through valve 16 enters housing 50 by way of tube 14, openings 68 and enters chamber 74. Then the air flows through the nozzle and is discharged at a point beneath strip 100 (FIGURE 13). Valve 16 is at all times, under the control of the operator of the gun for the reasons pointed out hereinbefore.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gun for welding elongated pieces of thermoplastic material to a panel, said gun comprising an elongated hollow housing having a heating element disposed therein, an air inlet means at one end of said housing and air outlet at the other end of said housing, an outlet tip structure carried by said housing and communicated with said air outlet, a guide mechanism supported from said housing adjacent but in poor transfer relationship with said tip structure and adapted to guide an elongated strip of thermoplastic material past said tip structure, said air inlet means including relief valve means for selectively venting said air inlet means to the ambient atmosphere, said relief valve means including a movable actuator operable from the exterior of said gun, said gun including a handle adjacent said relief valve means and having a portion adapted to be at least partially encircled by an operator's handle and shaped and positioned relative to said actuator for ease of actuation of said actuator by said hand without disengagement of said hand from said handle, said actuator being mounted for reciprocal movement between limited positions defining open and closed positions of said relief valve means and normally resiliently urge toward dependent position thereof defining said closed position.

2. The gun of claim 1 wherein said guide mechanism includes a sleeve mounted above said tip adapted to longitudinally receive said elongated strip, a pressure member carried by said sleeve and beneath which the elongate strip is adapted to pass.

3. The gun of claim 1 wherein said guide mechanism includes a sleeve mounted above said tip adapted to longitudinally receive said elongated strip, a pressure member carried by said sleeve and beneath which the elongate strip is adapted to pass, means carried by said sleeve by which to receive a tool for the application of force in a downward direction to increase the pressure between the elongate strip and panel.

4. The gun of claim 1 wherein there are means mounting said heating element in said housing spaced from the inside surface of said housing to thereby define with said inside surface of said housing and air chamber.

References Cited in the file of this patent

UNITED STATES PATENTS

| | | |
|---|---|---|
| 1,316,739 | Pitcher | Sept. 23, 1919 |
| 1,851,281 | Hudson | Mar. 29, 1932 |
| 2,176,139 | Lofgren | Oct. 17, 1939 |
| 2,220,545 | Reinhardt | Nov. 5, 1940 |
| 2,372,737 | Phillips | Apr. 3, 1945 |
| 2,437,263 | Manning | Mar. 9, 1948 |
| 2,556,609 | Arkless | June 12, 1951 |
| 2,786,511 | Reid | Mar. 26, 1957 |
| 2,862,543 | Kaminsky | Dec. 2, 1958 |